United States Patent [19]

Schuchardt et al.

[11] 3,789,715
[45] Feb. 5, 1974

[54] ROTARY CUTTING APPARATUS

[76] Inventors: Rudolf Schuchardt; Hans George Schuchardt, both of Pastfach 510 Hemer, Germany

[22] Filed: Jan. 4, 1972

[21] Appl. No.: 215,309

[52] U.S. Cl. ................... 83/663, 83/346, 83/698
[51] Int. Cl. ............................................. B26d 1/12
[58] Field of Search ..... 83/155, 326, 346, 698, 673, 83/663, 665; 156/515, 582; 76/107, 90, 101 A, 101 SM

[56] References Cited
UNITED STATES PATENTS
2,791,276   5/1957   Weller ........................ 83/346 X
3,645,155   2/1972   Robinson ..................... 83/698 X
3,395,598   8/1968   Martin ......................... 83/698 X
3,119,312   1/1964   Henc ........................... 76/107 C UX Primary Examiner—Travis S. McGehee
Assistant Examiner—W. Donald Bray

[57] ABSTRACT

For rotary cutting apparatus strip-like cutting blades are provided that can be easily handled in a universal manner. The cutting blades are of a cross-section so that they may be bent about an axis perpendicular to their longitudinal axis. A flat back-surface permits stable connection to a supporting surface. Longitudinal grooves may receive cement securing the blades to the supporting surface. Preferably, the supporting surface confines a support member made of transparent foil material that can be placed above a respective drawing indicating the desired pattern for the cutting blades.

12 Claims, 7 Drawing Figures

ROTARY CUTTING APPARATUS

BACKGROUND OF THE INVENTION

In the field of rotary cutting apparatus, it has been a problem to attach the cutting blades to the curved surface of a cutting cylinder. In a cloth cutting machine of the rotary cutting type according to U.S. Pat. No. 2,791,276, for example, cutting blades were spot welded or brazed to a flexible cutting belt made from a thin sheet of spring steel. The cutting blades are of small a cross-section as possible so they will readily flex to conform to the curvature of rollers around which the cutting belt is guided. The cutting blades have a triangular cross-section so that a sufficiently wide back-surface is obtained for supporting the cutting blades on the cutting belt and the cutting blades cannot tilt in the one or the other direction, no further measures being mecessary in order to maintain the cutting blades in their proper normal orientation with regard to the cutting belt. The connection between the cutting blades and the cutting belt, however, as pointed out, must be made by means of spot welding or brazing which is generally quite cumbersome and may entail considerable heat-up of the cutting blades as well as of the cutting belt material. Such heat-up, in turn, may cause distortions as well as changes in the structure of the hardened cutting blade material.

German Patent No. 898,390 — Schaedlich — discloses a cutting tool for rotary cutting apparatus wherein the cutting blades that likewise are of triangular cross-section are brazed by means of an appropriate gauge or template to a thin steel metal sheet, or threaded thereto. When the cutting blades are brazed to the supporting sheet metal, the same disadvantages arise as in connection with the arrangement taught by U.S. Pat. No. 2,791,276 whereas fastening the cutting blades by bolts is very expensive and time consuming, also susceptible to inaccuracies.

SUMMARY OF THE INVENTION

In accordance with the present invention, a striplike cutting blade for rotary cutting apparatus for the continuous cutting of forms from sheet material of paper, card board, corrugated paper or the like is provided, which strip-like cutting blade has an elongated body along whose longitudinal direction a cutting edge extends as in heretofore known cutting profiles. Likewise, a flat back-surface extends opposite to that cutting edge. Outer edges of the strip-like cutting blades are of curved convex cross-section so that they form elongated niche-like cavities when the flat surface is brought into engagement with a supporting surface of a support member. These niche-like recesses are capable of receiving cement for fastening the cutting blades to the support member and of avoiding the risk that the cement may easily peel off the supporting surface due to the disadvantageous distribution of the cement when applied to a triangular profile having the usual acute angles. The stability of the connection is thus increased to an extent that any speeds may be encountered without possible disengagement of the cutting blades.

In this manner, it is possible to fasten a cutting blade having for example a triangular cross-section — and thus the capability of following the curvature of a cutting cylinder — in a sufficiently rigid manner simply by using cement, without taking the risk that the cutting blade is detached from the support member even at high rotary speeds.

This effect can be increased if in the flat back-surface a groove-like recess is provided that extends in the longitudinal direction and is capable of receiving cement securing the cutting blade to the supporting surface of the support member.

In addition, lateral grooves may be provided along the lateral surfaces of the strip-like cutting blades so that the cement may grip into these longitudinal grooves thus further contributing to holding the cutting blade profile connected with the support member.

The support member preferably may be constituted of a transparent foil enabling attachment of the cutting blades to the support member directly in accordance with a drawing placed underneath the transparent foil. Beyond that, individual cutting blade sections may be attached to foil portions of smaller size and such foil portions of smaller size may then be fastened to a larger foil section surrounding for example a cutting cylinder. The fastening of the foil portions to the foil section may be carried out by means of strips of adhesive tape so that an unusually and surprisingly convenient mounting as well as dismounting of particular areas of a cutting tool is accomplished.

BRIEF DESCRIPTION OF THE DRAWINGS

For a better understanding of the invention, reference is to be had to the preferred embodiments, exemplary of the invention, shown in the accompanying drawings, in which.

DESCRIPTION OF THE PREFERRED EMBODIMENTS

Figure 1:
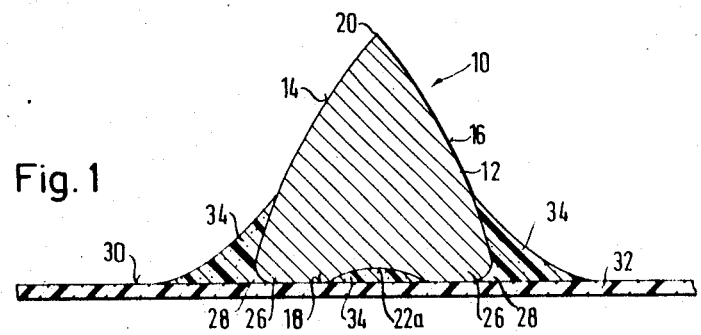
FIG. 1 is a schematic cross-section through a cutting blade incorporating the teachings of this invention and fastened to a foil-like support member by means of a suitable cement.

Referring in detail to FIG. 1, with 10 there is generally designated a cutting blade having a profile according to the invention with a cutting edge 20 extending in longitudinal direction of the cutting blade and a body 12 confined by inclined lateral surfaces 14 and 16, respectively, as well as a lower bottom flat surface 18, along which, in longitudinal direction, a groove-like recess 22a may extend.

Outer edges 26 of the flat surface 18 are of curved convex configuration so that niche-like cavities 28 are formed by the outer edges 26 when the cutting blade 10 according to the invention is placed upon a flat supporting surface 30 of a support member 32. Thus, the cross-section of the cutting blade 10 is similar to a heart, even though this cross-section is not required, as long as a cutting edge, a comparatively wide back-surface capable of preventing tilting of the profile and in particular the niche-like cavities are provided. Principally, though, the cross-section may also be that of a T, for example. When the cutting blade 10 is secured to the support member 32 by cement 34, that cement 34 may span the corner-like area formed between the lateral surfaces 14, 16 on the one hand and the supporting surface 30 on the other hand, thereby gripping within the niche-like cavities. Nevertheless, the flat back-surface may directly contact the supporting surface 30 so that accurate alignment of the blades with regard to a common level in which all cutting edges must extend is ensured. If the groove-like recess 22a is provided, the cement 34 may accumulate therein, again without disturbing the proper position of the cutting blade profile with regard to the support member.

Figure 2:
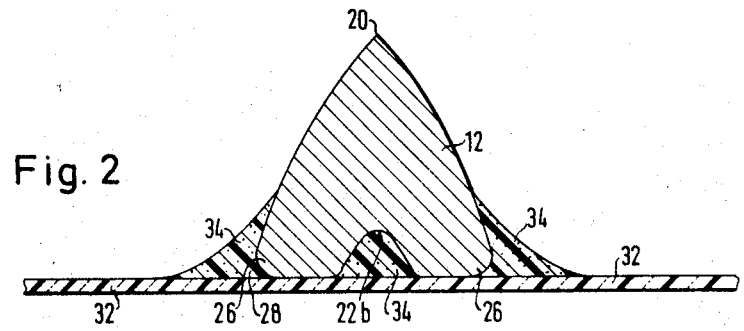
FIGS. 2 and 3 are illustrations similar to FIG. 1 with modified cross-sections of the cutting blades, in accordance with this invention.

In the embodiment according to FIG. 1, the groove-like recess 22a is comparatively shallow. As shown in FIG. 2, instead of the groove-like recess 22a of FIG. 1, alternatively a groove-like recess 22b may be provided having a substantially greater depth thus being capable of receiving a respectively larger amount of cement 34.

Figure 3:
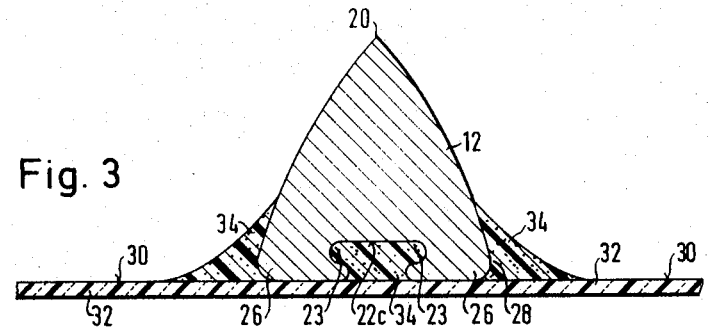

A further embodiment of this invention is shown by FIG. 3, wherein a groove-like recess 22c is provided having substantially the cross-section of a blunt T so that the recess 22c is undercut and exhibits lateral opposite channels 23 likewise extending in longitudinal direction together with the groove-like recess 22c. Cement 34 may enter into these channels and thus positively interlock cutting blade 10 with supporting member 32. This cross-section is of particular value when the blades are not made of steel, preferably hardened steel, but of aluminum, brass or plastic, for example.

Figure 4:
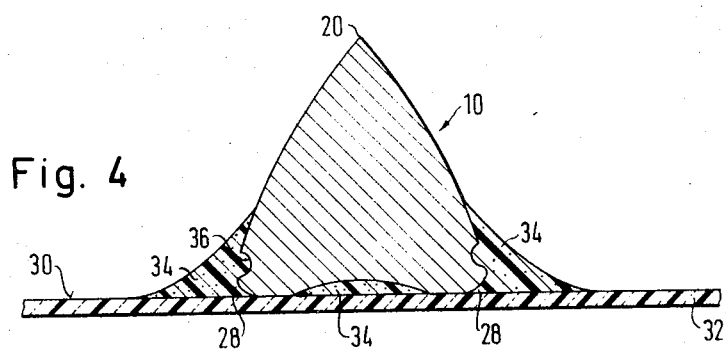
FIG. 4 is a further modification of a profile of a cutting blade in accordance with the invention.

In order to further strengthen the connection between support member 32 and cutting blade 10, as shown in FIG. 4, lateral grooves 36 may be provided into which cement 34 may grip in a manner similar as it grips into the channels 23 of FIG. 3 thus further strengthening the connection of cutting blade 10 to the support member 32.

Figure 5:
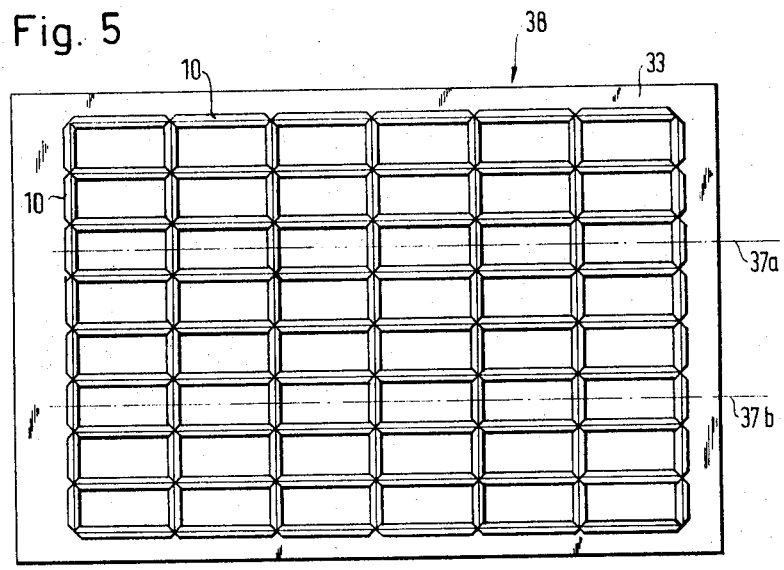
FIG. 5 is a schematic top view of a cutting tool made up in accordance with this invention.
Figure 6:
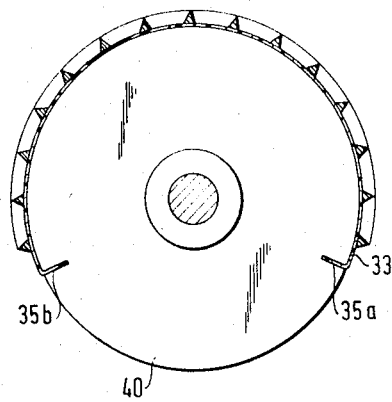
FIG. 6 is a cross section of a cutting cylinder equipped with a cutting tool as set forth by FIG. 5.

FIG. 5, schematically, represents a cutting tool 38 made in compliance with the invention. The support member 32 is constituted of a rectangular foil section 33 onto which the individual cutting blades 10 are secured in accordance with the desired cutting pattern. This foil section 33, at its one end may then be inserted into the radial slot 35a of a cutting cylinder as illustrated in FIG. 6. From there, the foil section 33 may be tensioned around the circumference of the cylinder 40 until the other end of the foil section 33 reaches a corresponding radial slot 35b into which it may be inserted and then clamped by a suitable tensioning device applying the required tension to the foil section 33. The cross-section of the cutting blades 10 will enable proper adaptation of the cutting blades to the curvature of the cutting cylinder 40, and the provision of the groove-like recesses 22a, b, c, respectively, as well as of the niche-like cavities 28, possibly in connection with the lateral grooves 36, will warrant a firm connection between the cutting blades 10 and the foil section 33, in spite of the curved extension of both parts. The curvature of the cutting blades, preferably is applied before the foil section is tensioned around the cutting cylinder 40, even though generally the blades may also be adapted to the configuration of the cylinder 40 only at the time when the foil is applied thereto, at least if the cutting edges are of greater length.

According to the invention, the foil section 33 preferably is made of transparent plastic material so that the foil section 33 may be placed just on top of a drawing exhibiting the final pattern to be assumed by the individual cutting blades. Thus, upon appropriate securement of the foil section with respect to the drawing, the cutting blades 10 may be mounted, by means of appropriate cement 34, to the foil section 33 simply by aligning the cutting blades to the respective lines indicating the desired course of the cutting blades, whereas no transfer of the dimensions set forth in the drawings onto the supporting surface 30 of the foil 33 is required as heretofore had to be carried out when opaque material such as sheet metal was used. Inasmuch as a cutting machine is to be equipped with a relatively great number of different cutting tools which all have to be prepared individually on the basis of a respective drawing, this method of using a transparent foil section allowing direct inspection of the drawing constitutes a considerable alleviation in preparing cutting tools and thus likewise an appreciable reduction in costs and an increase in accuracy.

The foil section 33 is resilient in a direction normal to its main plane so that the foil material may easily follow the configuration of the cutting cylinder 40. However, the foil material should not be resilient whatsoever in a direction parallel to its main plane so that the pattern once provided in preparing the cutting tool of FIG. 5 for example is definitely maintained when mounting said cutting tool to the cutting cylinder. Also, the foil material must have the sufficient rigidity so that centrifugal forces arising at higher speeds of the cutting cylinder are by no means capable of bulging the foil material to any extent. A certain bias applied to the foil section 33 when attached to the cutting cylinder will aid in preventing such bulging effects.

The size of the cross-section of the cutting blades will depend on the respective purpose for which the cutting blades are to be employed. However, the distance of the cutting edge 20 from the supporting surface 30 may be between from 2 – 10 mm.

Particularly if the cutting tool 38 as indicated by FIG. 5 is of larger size it may be advantageous to subdivide the foil section 33 into a plurality of several foil portions 33a, b, c, specifically with regard to the axial direction of the cylinder 40 so that in axial direction of the cutting cylinder 40 a number of foil portions 33a – c may be provided adjacent each other. The division of the foil section 33 into a plurality of foil portions 33a – c is indicated in FIG. 5 by the horizontal dash-dotted lines 37a and 37b, respectively.

The cutting cylinder 40 may cooperate in the usual manner with a pressure cylinder (not shown) within the frame work of a rotary cutting apparatus, the material to be cut being pressed against the circumference of the pressure roller and then cut by the cutting edges 20 of the individual cutting blades continuously rolled off the circumference of the pressure cylinder and the material to be cut, respectively.

Figure 7:
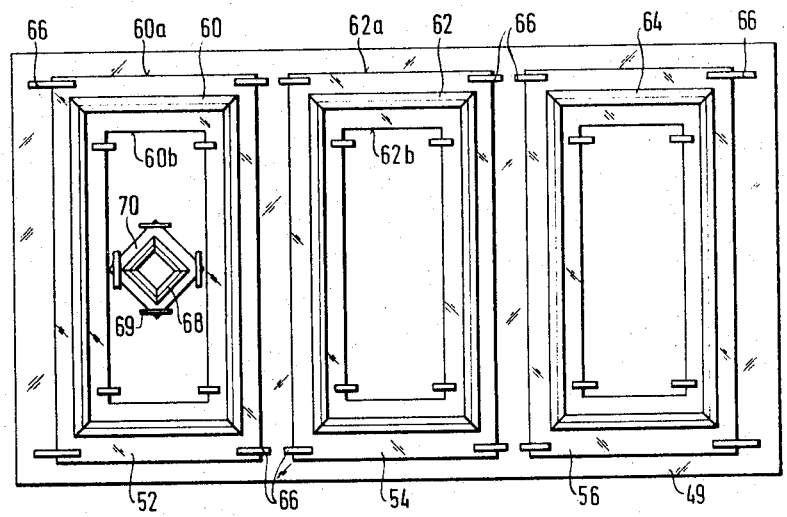
FIG. 7 a schematic top view of a cutting tool made up in accordance with a modified method of this invention.

FIG. 7 shows another embodiment of this invention wherein a basic foil section 49 is used not directly receiving the cutting blades as does the foil section 33 of FIG. 5. Rather, the cutting blades forming frames 60, 62, or 64, respectively, are attached to foil portions 52, 54, 56, respectively, each foil portion being defined by circumferential edges 60a, b, 62a, b ... . These foil portions 52, 54, 56, each constituting a sub-cutting tool, are connected to the basic foil section 49 by strips of adhesive tape 66 in order to secure the foil portions 52, 54, 56 to the basic foil section 49, which foil section is tensioned around part of the circumference of a cutting cylinder in a similar manner as foil section 33 in FIG. 6. A drawing is sandwiched between the outer circumference of the cutting cylinder and the inner surface of the foil section 49. The foil sections 52, 54, 56 which likewise are of transparent material in the same manner as foil section 49 are then fastened by means of the aforementioned strips of adhesive tape. The desired cutting pattern may still be observed through the two layers of foil material so that the cutting blades forming the frames 60, 62, 64, respectively, may be cemented to the individual foil portions 52 – 56, in compliance with the lines indicated by the drawing. Afterwards, the cutting tool so prepared may be detached from the cylinder in case that cylinder only served as an auxiliary means or it may be left there, possibly with the drawings still underneath for direct application as a tool.

In this manner, the invention is particularly versatile. The strips 66 of adhesive tape allow for easy engagement and disengagement of the foil portions and likewise for convenient alignment of the sub-cutting tools with regard to the drawing. A cutting tool may thus be easily altered and adapted to new requirements. For example, it may turn out that a certain amount of the forms prepared by the frames 60 – 64 should have a square-like window, so that a respective window 68 of cutting blades mounted to a foil portion 70 may be provided in the necessary manner within the area confined by frame 60, simply by fastening foil portion 70 together with window 68 by means of strips 69 of adhesive tape to the surface of foil section 49 which is available within edges 60b. Alignment of window 68 may be carried out by providing appropriate markings on the surface of foil section, by using corresponding lines of the drawing when still extending below foil section 49, or by utilizing a grid-like network permanently engraved in the surface of the cylinder receiving foil section 49.

What we claim is:

1. A strip-like cutting blade for rotary cutting apparatus for the continuous cutting of forms from sheet material of paper, cardboard, corrugated paper or the like, comprising an elongated body of substantially triangular cross-section, said elongated body having a cutting edge extending in the longitudinal direction of said elongated body, a flat back-surface extending opposite to said cutting edge, and lateral surfaces extending between said cutting edge and both sides of said flat back-surface, said back-surface having outer edges extending substantially parallel with respect to said cutting edge and defining the width of said back-surface, said outer edges being of curved convex cross-section so to form elongated niche-like cavities when said flat back-surface is brought into engagement with a supporting surface of a support member for receiving cement engaging both portions of reduced width of said lateral surfaces adjacent said flat back-surface and adjacent portions of said supporting surface for securing said cutting blade to the supporting surface.

2. A cutting blade as set forth in claim 1, wherein said flat back-surface has in addition to said niche-like cavities, a groove-like recess extending in said longitudinal direction for receiving cement securing said cutting blade to said support member.

3. A cutting blade according to claim 1, wherein, in addition to said nice-like cavities, at least one outer groove extends in said lateral surfaces substantially parallel with regard to said cutting edge and adjacent said outer edges in an area covered by said cement securing said cutting blade to said support member.

4. A cutting blade as set forth in claim 2, wherein the cross-section of said groove-like recess is of shallow curved configuration.

5. A cutting blade as set forth in claim 2, wherein said groove-like recess is of substantially V-shaped cross-section.

6. A cutting blade as set forth in claim 2, wherein said groove-like recess is of undercut cross-section including two opposite lateral channels.

7. A cutting tool comprising a basic foil section resilient in a direction normal to its main plane but substantially non-resilient in a direction parallel to its main plane, a plurality of strip like cutting blades deformable about an axis perpendicular to their longitudinal direction, said cutting blades having three longitudinal edges, one of said longitudinal edges constituting a cutting edge, and a flat surface opposing said cutting edge for engaging said foil when said blades are connected thereto by suitable cement, said foil being made of transparent material and capable of being tensioned around the circumference of a cutting cylinder without being stretched.

8. A cutting tool according to claim 7, wherein said foil is composed of a number of foil sections each carrying a number of cutting blades connected thereto by a suitable cement.

9. A cutting tool according to claim 7, wherein foil portions are attached to said basic foil section by means of strips of adhesive tape, said foil portions carrying cutting blades each forming a sub-cutting tool.

10. A rotary cutting apparatus comprising a pressure cylinder and a cutting cylinder having cutting blades extending along the circumference of said cutting cylinder and having cutting edges cooperating with the circumferential surface of said pressure roller, said blades being formed by strip-like bodies having flat back-surfaces facing said circumferential surface of said cutting roller and being cemented in any direction as required by a respective cutting pattern to a transparent foil tensioned around the circumference of said cutting cylinder.

11. A rotary cutting apparatus as set forth in claim 10, wherein the outer edges of said flat surface are of curved convex cross-section so to form elongated niche-like cavities in cooperation with the supporting surface of said foil.

12. A rotary cutting apparatus as set forth in claim 10, wherein said flat back-surfaces are provided with a groove-like recess for receiving cement securing said blades to said foil.

* * * * *